United States Patent
Wu

(10) Patent No.: US 8,433,188 B2
(45) Date of Patent: Apr. 30, 2013

(54) ACTUATOR AND CAMERA MODULE HAVING SAME

(75) Inventor: Sung-Ching Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 51 days.

(21) Appl. No.: 13/221,873

(22) Filed: Aug. 30, 2011

(65) Prior Publication Data

US 2013/0016962 A1    Jan. 17, 2013

(30) Foreign Application Priority Data

Jul. 14, 2011   (TW) .............................. 100124890 A

(51) Int. Cl.
*G03B 3/10* (2006.01)
*G03B 13/34* (2006.01)
*G03B 17/00* (2006.01)
*H04N 5/225* (2006.01)
*G02B 7/02* (2006.01)

(52) U.S. Cl.
USPC ............ 396/133; 396/529; 348/374; 359/824

(58) Field of Classification Search .................. 396/133, 396/429, 529; 359/340, 819, 822, 823, 824; 348/372, 374
See application file for complete search history.

(56) References Cited

U.S. PATENT DOCUMENTS

| | | | |
|---|---|---|---|
| 2007/0035859 A1* | 2/2007 | Sasaki ........................... | 359/823 |
| 2011/0026150 A1* | 2/2011 | Shyu et al. .................... | 359/824 |
| 2011/0141584 A1* | 6/2011 | Henderson et al. ........... | 359/811 |

* cited by examiner

*Primary Examiner* — Rochelle-Ann J Blackman
(74) *Attorney, Agent, or Firm* — Altis Law Group, Inc.

(57) ABSTRACT

An actuator includes a base, a stationary frame mounted on the base, a moveable frame received in the stationary frame and supported on the base, a shaft mounted on a side surface of the moveable frame, a flexible printed circuit, a piezoelectric motor, a first guide pole and a second guide pole. The flexible printed circuit is mounted on a sidewall of the stationary frame facing the shaft. The piezoelectric motor is mounted on the flexible printed circuit and engages with the shaft, and the first and second guide poles prevent any misalignment of the movable frame at any time and allow only axial movement of the movable frame.

16 Claims, 5 Drawing Sheets

ACTUATOR AND CAMERA MODULE HAVING SAME

BACKGROUND

1. Technical Field

The present disclosure relates to an actuator and a camera module having the actuator.

2. Description of Related Art

An actuator moves lenses along an optical axis in a camera module as part of an auto-focus function. The actuator includes a stationary frame, a moveable frame received in the stationary frame for receiving a lens module, a shaft fixed to a sidewall of the moveable frame, and a piezoelectric motor fixed on a sidewall of the stationary frame and matching with the shaft.

When in use, the piezoelectric motor drives the shaft along the optical axis of the lens module, thus the moveable frame with the lens module moves along the optical axis. However, the moveable frame may rotate relative to the stationary frame when it is subjected to an external force. The optical axis will not be followed and this may decrease the accuracy of the auto-focus function.

Therefore, it is desirable to provide an actuator and a camera module having the actuator, which can overcome or at least alleviate the limitations described.

DETAILED DESCRIPTION

Figure 1:
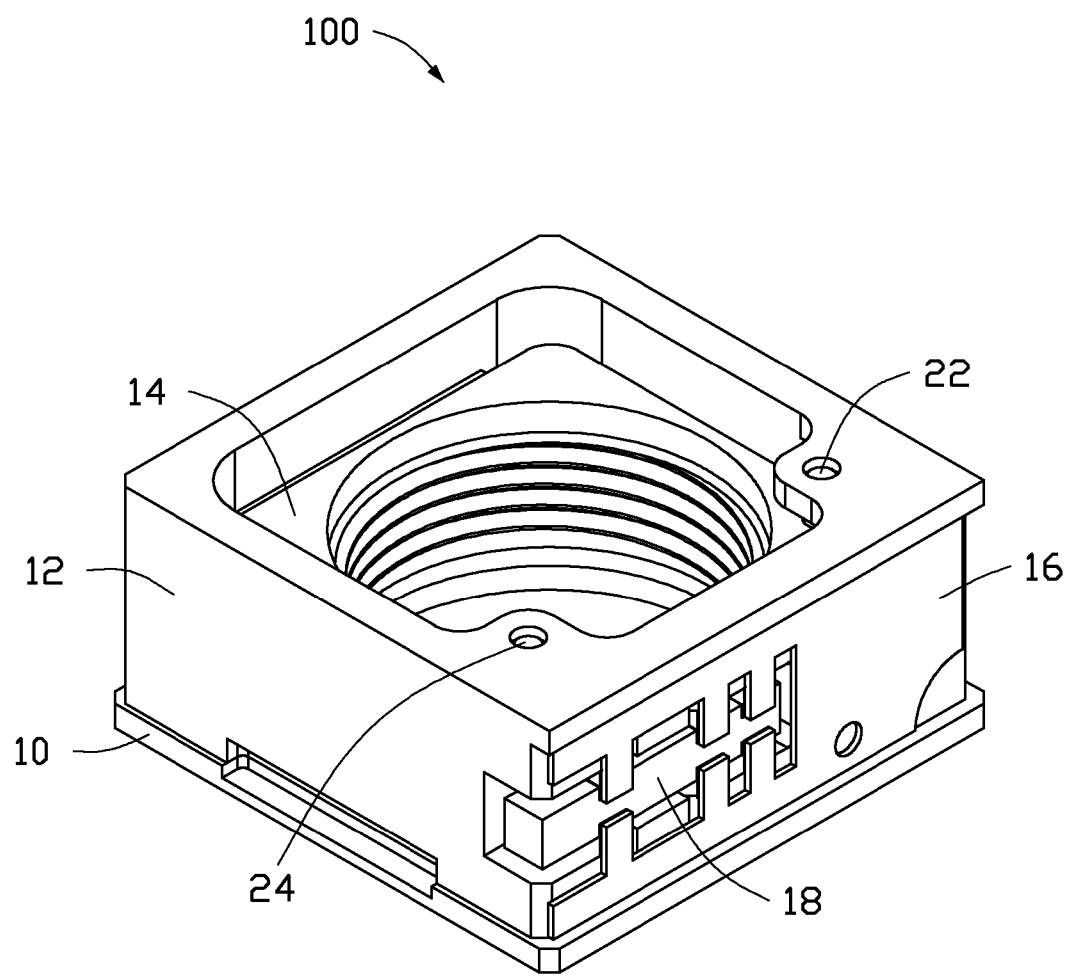
FIG. 1 is a schematic, isometric view of an actuator, according to a first exemplary embodiment.
Figure 2:
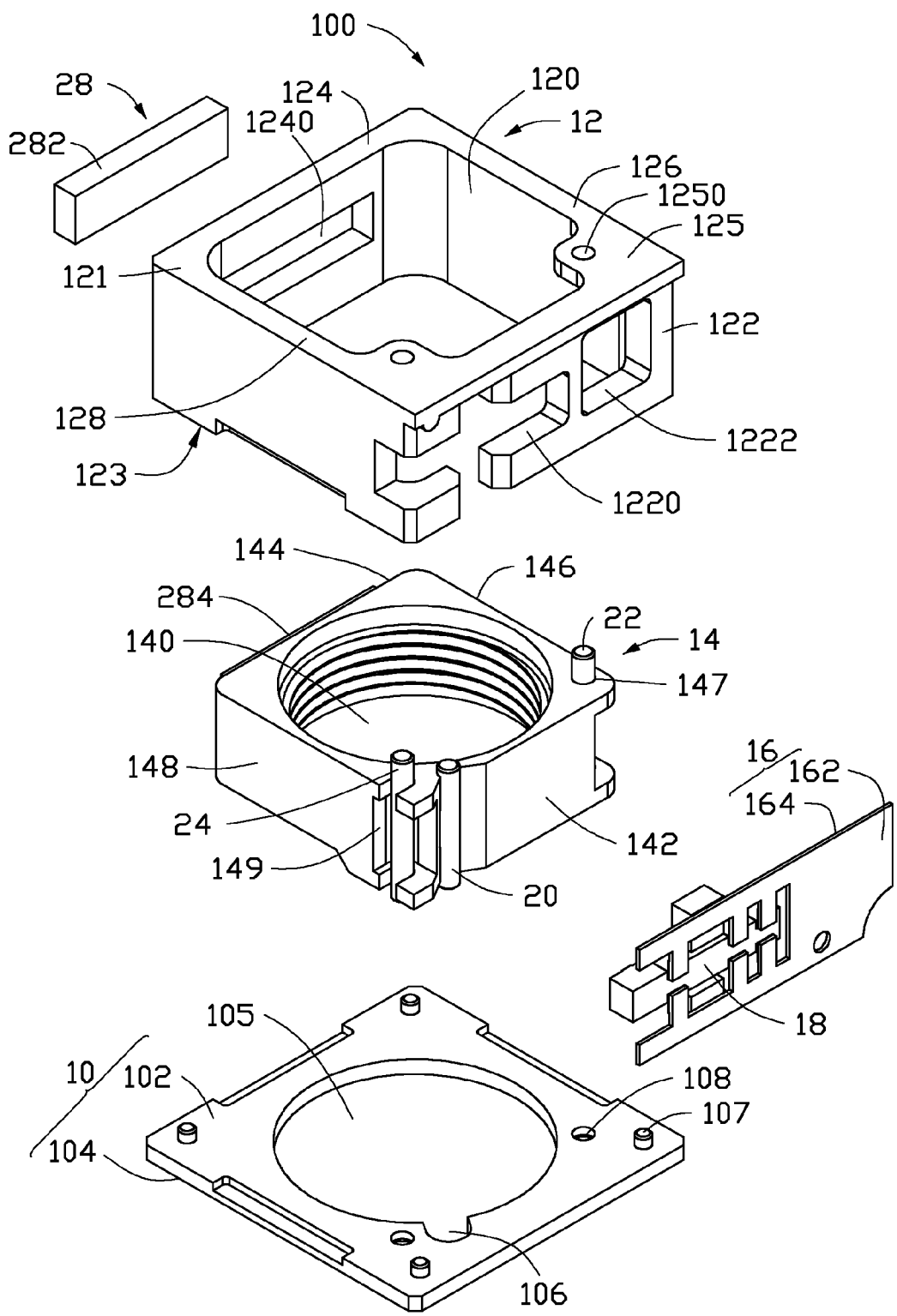
FIG. 2 is an exploded view of the actuator of FIG. 1.
Figure 3:
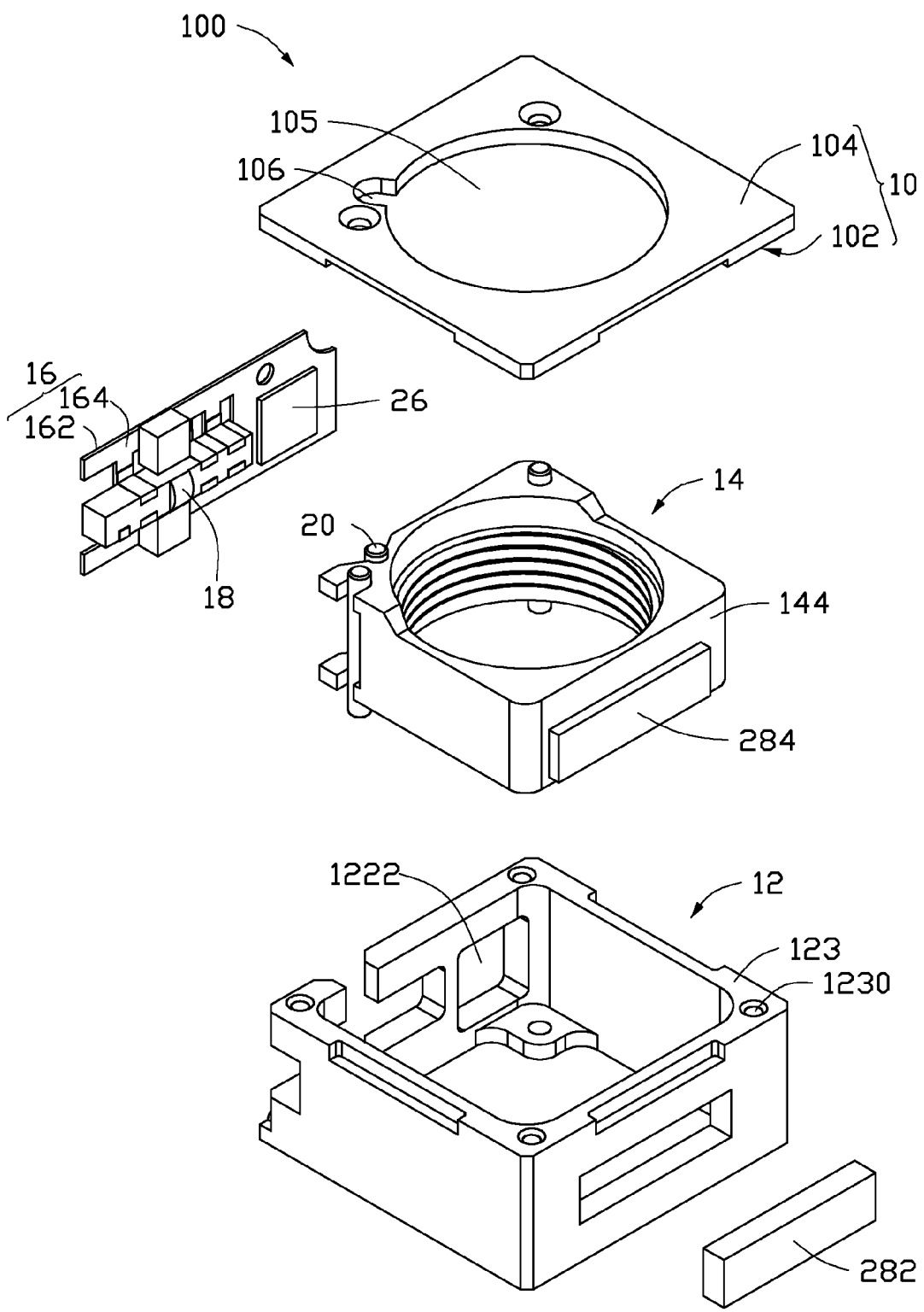
FIG. 3 is similar to FIG. 2, but viewed from another aspect.

Referring to FIGS. 1-3, an actuator 100, according to a first exemplary embodiment, includes a base 10, a stationary frame 12, a moveable frame 14, a flexible printed circuit (FPC) 16, a piezoelectric motor 18, a shaft 20, a first guide pole 22, a second guide pole 24, a drive circuit 26, and a magnetic assembly 28.

The base 10 is substantially cuboid. The base 10 includes a top surface 102 and a bottom surface 104. The top surface 102 and the bottom surface 104 are positioned at opposite sides of the base 10. The base 10 defines a circular aperture 105 and a semicircular through hole 106 in the form of a notch or cutout on the periphery of the aperture 105. The aperture 105 is positioned in a central portion of the base 10 and passes through the top surface 102 to the bottom surface 104. The through hole 106 is in communication with the aperture 105. Four locating studs (posts 107) perpendicularly extend from the four corners of the top surface 102. Two fixing holes 108 are defined at two neighboring corners of the top surface 102. The fixing holes 108 are independent of the aperture 105 and the through hole 106.

The stationary frame 12 is substantially cuboid and defines a first receiving room 120 for receiving the moveable frame 14. The stationary frame 12 includes a first sidewall 122, a second sidewall 124, a third sidewall 126, and a fourth sidewall 128. The first sidewall 122 is substantially parallel to the second sidewall 124. The third sidewall 126 is substantially parallel to the fourth sidewall 128. The first sidewall 122, the third sidewall 126, the second sidewall 124, and the fourth sidewall 128 connect end-to-end and cooperatively define the first receiving room 120. The first sidewall 122 defines a first receiving hole 1220 and a second receiving hole 1222 independent of the first receiving hole 1220. The second sidewall 124 defines a third receiving hole 1240. The stationary frame 12 includes an upper surface 121 and a lower surface 123 opposite to the upper surface 121. Two protrusions 125 extend from two neighboring corners of the upper surface 121 toward the first receiving room 120. A guide hole 1250 is defined in each of the protrusions 125. The two guide holes 1250 correspond to the two fixing holes 108. Each of the four corners of the lower surface 123 defines an engagement hole 1230, the four engagement holes 1230 correspond to the four posts 107.

In this embodiment, one of the two protrusions 125 is positioned at the intersection of the first sidewall 122 and the fourth sidewall 128, and the other of the two protrusion 125 is positioned at the intersection of the first sidewall 122 and the third sidewall 126. In other embodiments, the protrusions 125 may be positioned at any corner of the upper surface 121.

Figure 4:
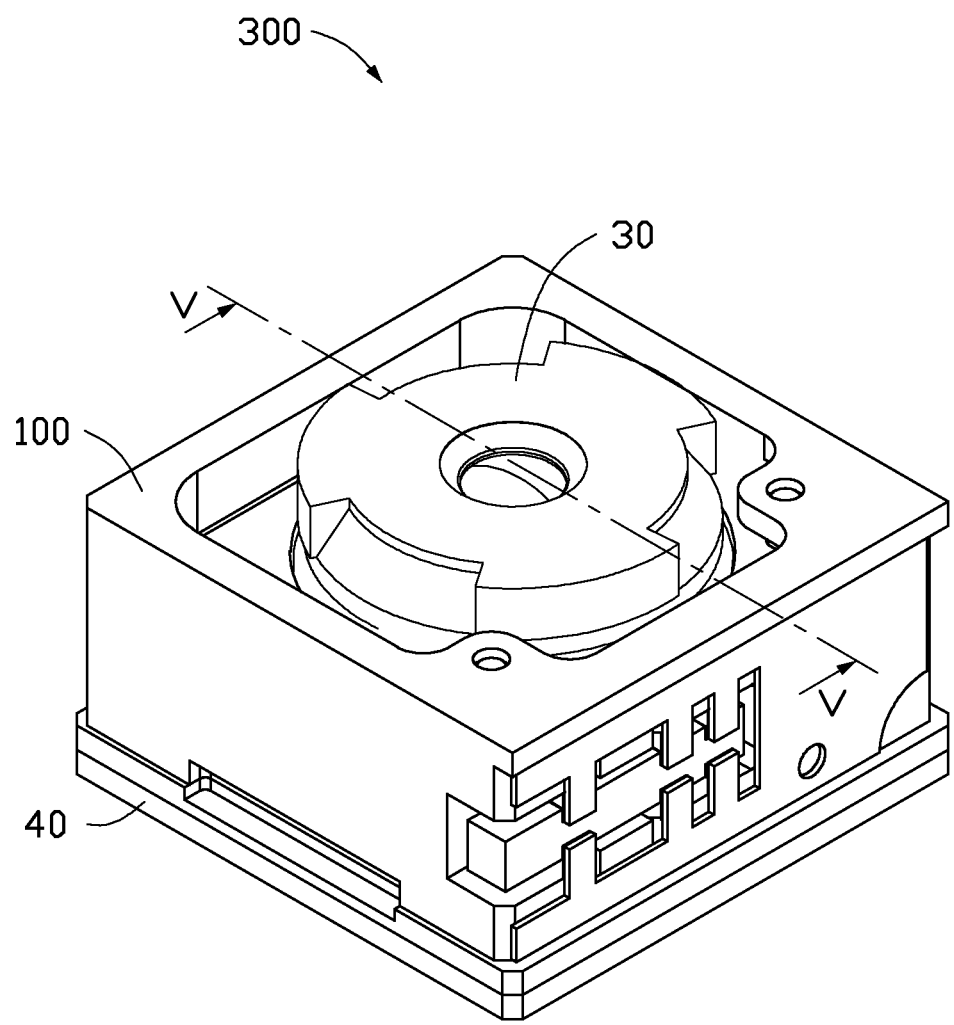
FIG. 4 is a schematic, isometric view of a camera module, according to a second exemplary embodiment.

The moveable frame 14 is substantially cuboid and defines a second receiving room 140 for receiving a lens module 30 (shown in FIG. 4). The moveable frame 14 is received in the first receiving room 120 and supported on the top surface 102. The moveable frame 14 includes a first side surface 142, a second side surface 144, a third side surface 146, and a fourth side surface 148. The first side surface 142 is substantially parallel to the second side surface 144. The third side surface 146 is substantially parallel to the fourth side surface 148. The first side surface 142, the third side surface 146, the second side surface 144, and the fourth side surface 148 connect end-to-end to cooperatively define the second receiving room 140. The first side surface 142 faces the first sidewall 122. The second side surface 144 faces the second sidewall 124. The third side surface 146 faces the third sidewall 126. The fourth side surface 148 faces the fourth sidewall 128. A hole 147 passing through the moveable frame 14 is defined in a corner of the moveable frame 14 at the intersection of the first side surface 142 and the third side surface 146. A cutout 149 passing through the moveable frame 14 is defined in a corner of the moveable frame 14 at the intersection of the first side surface 142 and the fourth side surface 148. The hole 147 corresponds to one of the guide holes 1250 and one of the fixing holes 108, and the cutout 149 corresponds to the other guide hole 1250 and the other fixing hole 108.

The FPC 16 includes a first surface 162 and a second surface 164. The first surface 162 and the second surface 164 are positioned at opposite sides of the FPC 16. The FPC 16 is mounted on the first sidewall 122, and the second surface 164 is attached to the first sidewall 122.

The piezoelectric motor 18 and the drive circuit 26 are mounted on the second surface 164 apart from each other. The piezoelectric motor 18 is electrically connected to the drive circuit 26. The piezoelectric motor 18 is received in the first receiving hole 1220, and the drive circuit 26 is received in the second receiving hole 1222.

The shaft 20 is mounted on the first side surface 142. The shaft 20 is positioned at the intersection of the first side surface 142 and the fourth side surface 148. The first guide pole 22 extends through the hole 147 and engages in the corresponding fixing hole 108, and the second guide pole 24 extends through the cutout 149 and engages in the corresponding fixing hole 108. In this embodiment, the shaft 20, the first guide pole 22, and the second guide pole 24 are made of stainless steel.

The magnetic assembly 28 includes a first magnet 282 and a second magnet 284. The first magnet 282 is received in the third receiving hole 1240. The second magnet 284 is attached to the second side surface 144 facing the first magnet 282. The magnetic pole of one end of the first magnet 282 adjacent to the second magnet 284 is the same as that of one end of the second magnet 284 adjacent to the first magnet 282.

In assembly, the first guide pole 22 extends through the hole 147, and one end of the first guide pole 22 is engaged in the corresponding fixing hole 108. The second guide pole 24 extends through the cutout 149, and one end of the second guide pole 24 is engaged in the corresponding fixing hole 108 so that the moveable frame 14 is supported on the top surface 102 of the base 10. The shaft 20 is attached on the first side surface 142 with adhesive. The through hole 106 allows room for the shaft 20. The second magnet 284 is mounted on the second side surface 144. The FPC 16 is attached to the first sidewall 122 with adhesive. The piezoelectric motor 18 is received in the first receiving hole 1220. The drive circuit 26 is received in the second receiving hole 1222. The first magnet 282 is mounted in the third receiving hole 1240. The four posts 107 extend through the respective engagement holes 1230 and are secured with glue so that the stationary frame 12 is mounted on the base 10 and receives the moveable frame 14. The piezoelectric motor 18 is aligned with the shaft 20, such that when activated, the piezoelectric motor 18 moves the shaft 20 in steps. The first magnet 282 faces the second magnet 284 so that the repulsive force between them pushes the moveable frame 14 towards the piezoelectric motor 18. The other end of the first guide pole 22 engages in the corresponding guide hole 1250, and the other end of the second guide pole 24 engages in the corresponding guide hole 1250.

When in use, the drive circuit 26 governs the operation of the piezoelectric motor 18. The piezoelectric motor 18 drives the shaft 20 to move in either direction along an optical axis OO' of the lens module (shown in FIG. 5), depending on direction of current applied to the piezoelectric motor 18, thus the moveable frame 14 moves along the optical axis OO' in the desired direction and for the desired distance. The repulsive force between the first magnet 282 and the second magnet 284 ensures the proper distance between the piezoelectric motor 18 and the shaft 20. During this process, the first guide pole 22 and the second guide pole 24 prevent any rotation of the movable frame 14 relative to stationary frame 12 when the moveable frame 14 is subjected to a force between the piezoelectric motor 18 and the shaft 20. Therefore, the optical axis OO' of the lens module 30 always coincides with the central axis of the stationary frame 12 and the accuracy of the auto-focus function is assured.

Figure 5:
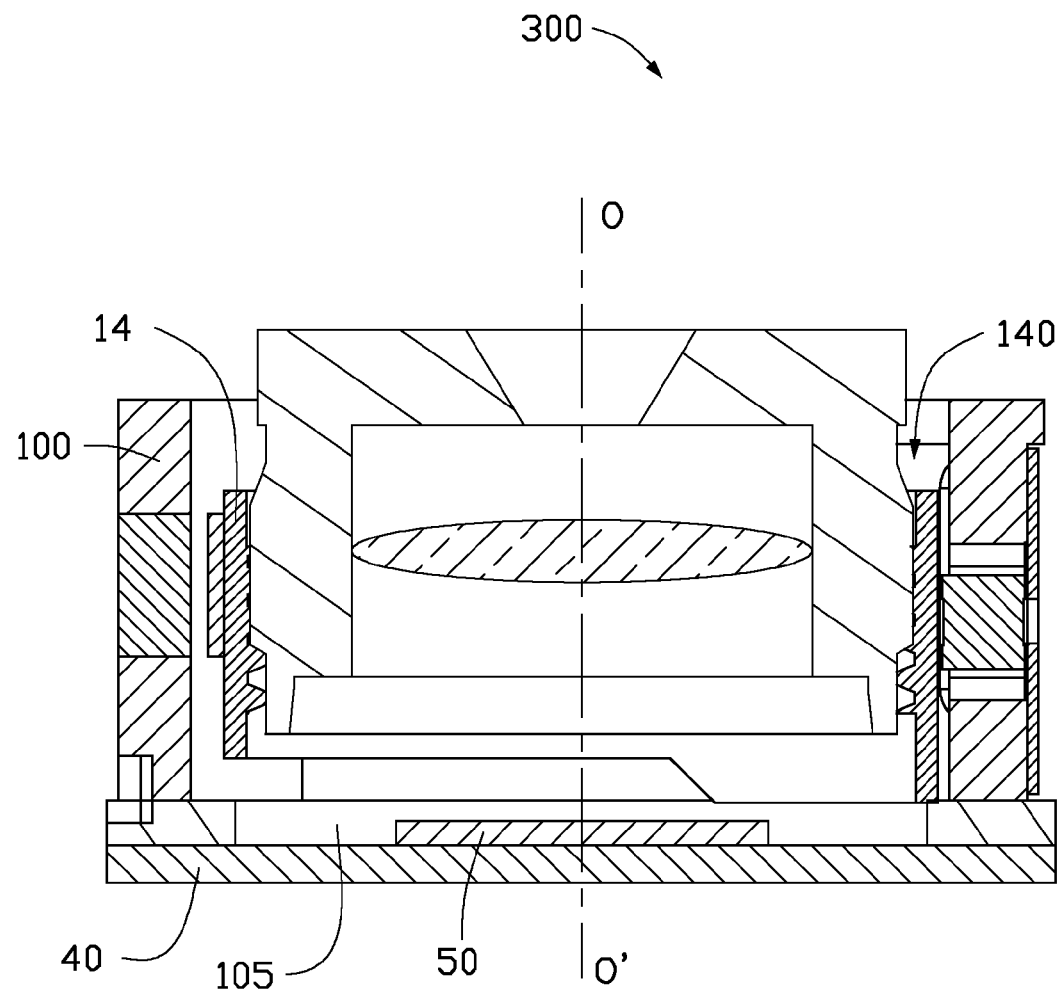
FIG. 5 is a sectional view taken along line V-V of the camera module of FIG. 4.

Referring to FIGS. 4-5, a camera module 300, according to a second exemplary embodiment, is shown. The camera module 300 includes the actuator 100, a lens module 30, a substrate 40, and an image sensor 50. The lens module 30 is received in the second receiving room 140. The actuator 100 is supported by the substrate 40. The image sensor 50 is positioned on the substrate 40 and received in the aperture 105. The optical axis OO' of the lens module 30 is aligned with the center of the image sensor 50 and the aperture 105. When the camera module 300 is in use, the moveable frame 14 with the lens module 30 moves only along the optical axis OO', thereby achieving an auto-focus function.

The advantages of the camera module 300 of the second embodiment are similar to those of the actuator 100 of the first embodiment.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An actuator comprising:
    a base;
    a stationary frame being substantially a cuboid and mounted on the base, the stationary frame comprising a first sidewall and a second sidewall substantially parallel to the first sidewall;
    a moveable frame received in the stationary frame and supported on the base, the moveable frame being substantially a cuboid and comprising a first side surface and a second side surface substantially parallel to the first side surface, the first side surface facing the first sidewall, and the second side surface facing the second sidewall;
    a shaft mounted on the first side surface of the moveable frame;
    a flexible printed circuit mounted on the first sidewall of the stationary frame facing the shaft;
    a piezoelectric motor mounted on the flexible printed circuit and engaging with the shaft;
    a first guide pole extending through the moveable frame, one end of the first guide pole fixed on the base, the other end of the first guide pole fixed on the stationary frame; and
    a second guide pole extending through the moveable frame, the second guide pole being spaced from and parallel to the first guide pole, one end of the second guide pole fixed on the base, the other end of the second guide pole fixed on the stationary frame.

2. The actuator as claimed in claim 1, further comprising a magnetic assembly, wherein the magnetic assembly comprises a first magnet and a second magnet, the first magnet is mounted on the second sidewall, the second magnet is mounted on the second side surface facing the first magnet, and a repulsive force is generated between the first magnet and the second magnet.

3. The actuator as claimed in claim 2, further comprising a drive circuit, wherein the first sidewall defines a first receiving hole and a second receiving hole apart from the first receiving hole, the piezoelectric motor is received in the first receiving hole, the drive circuit is mounted on the flexible printed circuit and received in the second receiving hole, and the drive circuit is electrically connected to the piezoelectric motor.

4. The actuator as claimed in claim 3, wherein the second sidewall defines a third receiving hole, and the first magnet is received in the third receiving hole.

5. The actuator as claimed in claim 3, wherein the first guide pole, the second guide pole, and the shaft are made of stainless steel.

6. The actuator as claimed in claim 5, wherein the stationary frame is attached on the base with adhesive.

7. The actuator as claimed in claim 3, wherein the stationary frame further comprises a third sidewall and a fourth sidewall substantially parallel to the third sidewall, the first sidewall, the third sidewall, the second sidewall, and the fourth sidewall connect end-to-end, the moveable frame further comprises a third side surface and a fourth side surface substantially parallel to the third sidewall, the first side surface, the third side surface, the second side surface, and the fourth side surface connect end-to-end, the third side surface faces the third sidewall, and the fourth side surface faces the fourth sidewall.

8. The actuator as claimed in claim 2, wherein the magnetic pole of one end of the first magnet adjacent to the second magnet is the same as that of one end of the second magnet adjacent to the first magnet.

9. A camera module comprising:
an actuator comprising:
    a base;
    a stationary frame being substantially a cuboid and mounted on the base, the stationary frame comprising a first sidewall and a second sidewall substantially parallel to the first sidewall;
    a moveable frame received in the stationary frame and supported on the base, the moveable frame being substantially a cuboid and comprising a first side surface and a second side surface substantially parallel to the first side surface, the first side surface facing the first sidewall, and the second side surface facing the second sidewall;
    a shaft mounted on the first side surface of the moveable frame;
    a flexible printed circuit mounted on the first sidewall of the stationary frame facing the shaft;
    a piezoelectric motor mounted on the flexible printed circuit and engaging with the shaft;
    a first guide pole extending through the moveable frame, one end of the first guide pole fixed on the base, the other end of the first guide pole fixed on the stationary frame; and
    a second guide pole extending through the moveable frame, the second guide pole being spaced from and parallel to the first guide pole, one end of the second guide pole fixed on the base, the other end of the second guide pole fixed on the stationary frame;
a lens module received in the moveable frame;
a substrate supporting the actuator; and
an image sensor supported by the substrate and received in the base, an optical axis of the lens module aligned with the center of the image sensor.

10. The camera module as claimed in claim 9, further comprising a magnetic assembly, wherein the magnetic assembly comprises a first magnet and a second magnet, the first magnet is mounted on the second sidewall, the second magnet is mounted on the second side surface facing the first magnet, and a repulsive force is generated between the first magnet and the second magnet.

11. The camera module as claimed in claim 10, further comprising a drive circuit, wherein the first sidewall defines a first receiving hole and a second receiving hole apart from the first receiving hole, the piezoelectric motor is received in the first receiving hole, the drive circuit is mounted on the flexible printed circuit and received in the second receiving hole, and the drive circuit is electrically connected to the piezoelectric motor.

12. The camera module as claimed in claim 11, wherein the second sidewall defines a third receiving hole, and the first magnet is received in the third receiving hole.

13. The camera module as claimed in claim 11, wherein the first guide pole, the second guide pole, and the shaft are made of stainless steel.

14. The camera module as claimed in claim 13, wherein the stationary frame is attached on the base with adhesive.

15. The camera module as claimed in claim 10, wherein the magnetic pole of one end of the first magnet adjacent to the second magnet is the same as that of one end of the second magnet adjacent to the first magnet.

16. The camera module as claimed in claim 11, wherein the stationary frame further comprises a third sidewall and a fourth sidewall substantially parallel to the third sidewall, the first sidewall, the third sidewall, the second sidewall, and the fourth sidewall connect end-to-end, the moveable frame further comprises a third side surface and a fourth side surface substantially parallel to the third sidewall, the first side surface, the third side surface, the second side surface, and the fourth side surface connect end-to-end, the third side surface faces the third sidewall, and the fourth side surface faces the fourth sidewall.

* * * * *